United States Patent
Palmer

(10) Patent No.: US 10,488,833 B2
(45) Date of Patent: Nov. 26, 2019

(54) CONTROL SYSTEM

(71) Applicant: Paxton Access Limited, Brighton (GB)

(72) Inventor: Bill Palmer, Brighton (GB)

(73) Assignee: Paxton Access Limited, Brighton (GB)

( * ) Notice: Subject to any disclaimer, the term of this patent is extended or adjusted under 35 U.S.C. 154(b) by 556 days.

(21) Appl. No.: 14/734,836

(22) Filed: Jun. 9, 2015

(65) Prior Publication Data

US 2015/0355613 A1 Dec. 10, 2015

(30) Foreign Application Priority Data

Jun. 10, 2014 (GB) .................... 1410330.3

(51) Int. Cl.
*G05B 15/02* (2006.01)
*H04L 12/28* (2006.01)
(52) U.S. Cl.
CPC .......... *G05B 15/02* (2013.01); *H04L 12/2816* (2013.01); *G05B 2219/2642* (2013.01)
(58) Field of Classification Search
CPC .................................................... G05B 15/02
See application file for complete search history.

(56) References Cited

U.S. PATENT DOCUMENTS

| 9,208,676 | B2* | 12/2015 | Fadell | G05B 19/042 |
| 2002/0099945 | A1* | 7/2002 | McLintock | G07C 9/00103 |
| | | | | 713/186 |
| 2008/0281472 | A1* | 11/2008 | Podgorny | G05B 15/02 |
| | | | | 700/276 |
| 2010/0042230 | A1 | 2/2010 | Tangsoo | |
| 2010/0307206 | A1 | 12/2010 | Taylor et al. | |
| 2013/0173539 | A1* | 7/2013 | Gilder | G06F 17/30578 |
| | | | | 707/622 |
| 2014/0001846 | A1* | 1/2014 | Mosebrook | H04L 12/2816 |
| | | | | 307/11 |

(Continued)

FOREIGN PATENT DOCUMENTS

| EP | 2849066 A1 | 3/2015 |
| WO | 2013128338 A1 | 9/2013 |

OTHER PUBLICATIONS

Search Report dated Oct. 1, 2015 in Great Britain Patent Application No. GB1410330.3, 6 pages.

(Continued)

*Primary Examiner* — Jason Lin
(74) *Attorney, Agent, or Firm* — Perkins Coie LLP

(57) ABSTRACT

The present technology relates to building management control systems, such as a distributed database arrangement for systems that control functional aspects in buildings. A method and controller for controlling one or more building control or access devices in response to events, comprises an interface operable to communicate with a server storing a database containing logic for controlling the devices in response to events; a memory operable to store a local copy of a subset of the database, the subset of the database containing logic relevant to a group of the devices; wherein the controller is configured to receive updates to the local copy of the subset of the database; wherein the controller is operable to receive one or more signals indicative of the events relevant to said group of the devices; and wherein the controller is operable to control the group of devices in response to the signals.

18 Claims, 5 Drawing Sheets

(56) References Cited

U.S. PATENT DOCUMENTS

2014/0005809 A1    1/2014  Frei et al.
2014/0096126 A1    4/2014  Schultz et al.
2015/0082033 A1*   3/2015  Bruce ...................... G06F 9/54
                                                         713/168

OTHER PUBLICATIONS

Search Report dated Oct. 19, 2015 in European Patent Application No. 15171237.9, 7 pages.
European Examination Report received for co-pending European Application No. 15171237.9; Applicant: Paxton Access Limited, dated Nov. 5, 2018, 9 pages.

* cited by examiner

CONTROL SYSTEM

RELATED APPLICATIONS

This application claims priority to United Kingdom Application No. GB 1410330.3, filed 10 Jun. 2014, entitled "Control System", which is incorporated herein by reference.

TECHNICAL FIELD

The present technology relates to building management control systems. More particularly, the present technology relates to a distributed database arrangement for systems that control functional aspects in buildings.

BACKGROUND

There are various different systems that can be installed in buildings; for example, climate control (heating, air conditioning or ventilation units) or access control systems (which determine when to allow access to buildings or systems).

Access control systems may be used to control devices for use at access points on a site, such as doors or gates, through which a user may gain access to a restricted area. A system may authenticate individuals in several ways. For example, a password or personal identification number (PIN) may be entered at or near an access point. Tokens or access cards can store a user identifier or credential, which can be read electronically by a reader placed at or near an access point. Alternatively, biometric data such as fingerprint, face or retina recognition can be used. Some systems may use a combination of these for improved security. Based on the authentication process, the system determines how to control each access point (e.g. whether to open or unlock the door or gate). A controller can be configured to make this determination, based on the authentication and system settings. It is likely that the authentication and system settings will be altered from time-to-time, for example to add new users. The controller may use logic stored in a database in order to make a determination. As settings are changed, the logic will be updated. Access control systems are becoming increasingly large and complex; for example there may be many access points within a given system and thus a large amount of logic data. As systems increase in size, they can become inefficient. A controller may be located some distance from devices it is required to control, increasing response times between device and controller. Furthermore, the logic database may become large and complex and access to data on such large databases can be slow, especially whilst the database is being updated, which may occur frequently.

Separate to the access control system, other devices on the site (e.g. heating or air conditioning units) may be controlled based on factors such as the time of day, temperature and/or humidity. In these cases, controllers or sensors such as timers or thermostats are often used. Each controller, sensor and device has its own logistical requirements, such as power and data cabling.

The present technology seeks to alleviate some of the problems with present control systems.

SUMMARY

According to a first aspect of the present technology, there is provided a building or access management controller for controlling one or more building control or access devices in response to one or more events, comprising an interface operable to communicate with a server, wherein a database is provided on the server, and wherein the database contains logic for controlling said one or more devices in response to said one or more events; a memory operable to store a local copy of a subset of the database, the subset of the database containing logic relevant to a group of said one or more devices; wherein the controller is configured to receive from the server updates to said local copy of said subset of the database; wherein the controller is operable to receive one or more signals indicative of said one or more events relevant to said group of said one or more devices; and wherein the controller is operable to control said group of said one or more devices in response to said one or more signals.

The present technology can provide the benefit that devices that would normally be controlled in separate systems can be consolidated under the control of one system, providing a more capable control system such as, for example, access control or environmental control systems.

The present technology can provide control for systems which contain a large number of devices by dividing the devices into groups and providing an individual controller for each group. The present technology can advantageously provide an efficient means for handling data in such control systems.

By providing a controller that can be located physically closer to a device or group of devices, without the need for control decisions to be made at a central server, response times can be improved as communications can be faster. This can provide an improved user experience as the system can exhibit a quicker response. Further, it is possible that cabling can be provided more efficiently as only one data link is required between a server and a controller and local devices only need physically shorter data links or less capable wireless transceivers.

Another potential advantage of the present technology is a reduction in the time required to make control decisions due to only a subset of the database being provided at each controller. As the subset of the database contains less data, the logic in the subset of the database can be accessed quicker. This can provide an improved user experience as the system can exhibit a quicker response.

Further, only the data traffic from a subset of the devices in the system needs to be processed by a controller. Therefore controller hardware should require less processing power and/or memory capacity than a central server controlling all devices in a system and more efficient hardware can be used. Alternatively, the controller hardware can provide a reduction in response time due to more efficient use of processor and memory resources compared to a central server controlling all devices. This can provide an improved user experience as the system can exhibit a quicker response. In addition, as data traffic only needs to flow between the devices and the controller, rather than the devices and the server, data traffic at the server can be reduced. This can be an advantage in systems where the server cannot be accessed continuously, i.e. if communication between controller and server is unreliable (e.g. due to being a wireless link), or the server is not constantly active (e.g. the server may be put in a standby mode, or shut down to save power; and/or the controller may have its own uninterruptible power supply i.e. a battery pack, while the server may be powered from the mains, and therefore subject to power cuts).

It is also desirable to have a quick and simple way of updating the database. By providing a database on a central server and only updated a subset of the database stored on a local controller, the present technology can provide a simple mechanism to update the system by allowing an administrator to update the central database. Each controller then only receives the data needed to update the relevant subset of the database stored on that controller. Additionally, the server only needs to be active when the system is being updated.

Preferably, the controller is configured to control at least some of said group of one or more devices based on read-only access to the local copy of the subset of the database in response to at least some of said one or more events.

Writing to a database can interfere with the speed of read access to the data stored in the database. By only opening the database in "read-only" mode, i.e. no write-access is allowed to the local copy of the subset of the database, any delays in accessing the data associated with "write" functions (e.g. delete/insert/update procedures) are avoided. When database access time is reduced, the controller may be able to access or execute the logic faster or more efficiently, hence can provide more efficient control of the devices or a faster response time.

Preferably, the logic contained in the local copy of the database stored on the controller is optimised for read access by storing the logic in a read-optimised arrangement different to the arrangement of the logic in the database provided on the server.

By providing the logic for controlling the devices in an optimised format, the controller can access the logic quicker or more efficiently and potentially requiring less processing overhead. Some of the organisational data stored on the server will likely be arranged in a hierarchical format, especially when the server is required to store large quantities data relating to a complex control system. This arrangement may optimise the processor or memory requirements of the server however, read access to data stored in this way can be slow and therefore less efficient for a controller accessing logic stored in such a database. Therefore optimising the logic stored on the controller means the logic can be searched and accessed more efficiently.

Preferably, the memory is operable to store a further local copy of said subset of the database; the controller is configured to write said received updates to the further local copy of the subset of the database; and the controller is configured to replace the logic stored in said local copy of said subset of the database with the updated logic stored in said further local copy of said subset of the database.

By providing a further local copy of the subset of the database, the local copy of the subset of the database can remain available for read access as the updates are not written directly to the local copy of the subset of the database when they are received at the controller. The process of updating the logic in the further local copy of the database requires slower "write" access to the data. Once the updates to the further local copy of the subset of the database are deemed to be complete, it may be possible to quickly update the local copy of the subset of the database by temporarily pausing access to the local copy and replacing the entire local copy with the further local copy of the subset of the database. This process may enable the update of the local copy of the subset of the database to be performed more quickly than writing individual updates while the database is being read. Hence, the process of updating the logic can be achieved more efficiently and may minimise the delay in access to the predetermined logic, which may be continuously required.

Preferably, when communications with the server are unavailable, the memory is operable to store a cache of at least one of: data to be sent to the server; and data received from the server.

By providing a cache store of data waiting to be sent to the server and in the process of being received from the server, this data will not be lost if communications with the server go down. Once communications are resumed, the controller may continue sending or receiving data to or from the server. It may be possible to hold a record of any segments of data that had been sent to the server, or of only the sections of data that had not been sent, when communications failed; advantageously, it would only be necessary to send the part of the data that have not already been received by the server. Communications with the server may be unavailable for a number of reasons; for example in cases where the system contains many controllers, there may be a large amount of data traffic at the server and the server may not have the processing power to maintain communications with all controllers in the system concurrently; alternatively, the link between the server and controller may be subject to interference or may not always be strong enough to maintain permanent communications between server and controller or the server may be unavailable due to maintenance. As some or all of the logic required for controlling the devices is stored at the controller, the controllers can continue to provide instructions to the devices even when communications with the server are unavailable.

Preferably, the controller is operable to communicate wirelessly with at least one of: the server; and at least one of said group of one or more group of devices.

By providing wireless communications, fewer wires are needed. Such systems may be easier or cheaper to install, and take up less space once they are installed. This may be particularly desirable in large systems, which contain multiple controllers and/or many devices, as providing wired communications throughout such systems may be very bulky and become very complicated.

Preferably, the controller is configured to receive data indicative of the status of the group of one or more devices.

By receiving data relating to the status of the devices, the controller may be able to utilise this data when using the logic stored in the subset of the database. This may be particularly useful in cases where the control of a device should be based on its status, for example whether the status of a door indicated whether it is open or closed.

Preferably the controller is further configured: to store at least a portion of the received data indicative of the status of said group of one or more devices; and/or to send, to at least one of the server and one or more other controllers, at least a portion of the received data indicative of the status of said group of one or more devices.

By storing data indicating the status of the devices, the controller may use this data to provide future control for the devices. It may also be useful in allowing a system administrator to access this information. An advantage of sending some or all of the status data of the devices connected to a controller to another controller or the server is that this data can then be used to control devices connected to other controllers or for updating the database on the server. By providing the server with status information for the devices, the server can maintain a complete record of the status of the entire system.

Preferably, the controller is configured: to store a record of the control of said group of one or more devices; and/or to send, to at least one of the server and one or more other controllers, at least a portion of the record of the control of said group of one or more devices.

By retaining a log of any control decisions made and/or any events that have been detected by readers or input devices, the controller can use previous decision data when applying the logic stored in the subset of the database. For example, it may be possible to detect that an access card has been cloned if it is used to access the same door multiple times in a short space of time. Additionally, it may be possible to provide a copy of the log to the server. Providing a log at either or both of the controller and the server may be useful for system administrators to audit the system.

Preferably, the memory is operable to store, in a location separate from the local copy of the subset of the database, one or both of: the at least a portion of the received data indicative of the status of said group of one or more devices; and the record of the control of said group of one or more devices.

By storing status and/or log data separately from the logic governing the control of the devices, the local copy of the subset of the database is kept concise. This can maintain the advantages of the speed and efficiency with which the logic stored in the database can be retrieved. This can also make it possible to retain the speed and efficiency advantages of using a read-only database for the predetermined logic, while enabling the flexibility of read-write access to provide storage of the status and/or log data.

Preferably, each of said building control or access devices can be an input and/or output device and wherein said one or more signals indicative of said one or more events are received from the one or more input devices.

By providing input devices which can send signals indicative of certain events to the controller, the controller can be accurately informed of any events which may be relevant to the control of output devices it may be operable to control. In some examples, the controller may also provide control to input devices, for example, instructing an input device to perform a measurement (i.e. of temperature).

Preferably, the controller, based on read-only access to the local copy of the subset of the database in response to receiving one or more signals indicative of at least some of said one or more events, is operable to: identify that the logic stored in the local copy of the subset of the database is insufficient for controlling said group of one or more devices in response to one or more received signals; and send, to the server, a request indicative of the further logic required to control said group. Preferably, in response to receiving said request, the server is operable to send at least one of: an update of logic in the local copy of the subset of the database to the controller; an indication for controlling said group of one or more devices in response to said one or more received signals indicative of at least some of said one or more events to at least one of: the controller; and at least one of said group of one or more devices.

By providing some of the logic required to the control the group of devices at the server, it may be possible for the controller to store logic required for functions that require a rapid response (i.e. opening a door) at the controller and for functions in which some delay is acceptable (i.e. altering a room temperature) at the server. Advantageously, this would further reduce the quantity of logic stored at the controller, allowing faster access to the logic, a quicker control response time and an improved user experience.

Preferably the one or more events are selected from one or all of the group comprising: acquisition of a credential; identification of an entity; detection of user input; detection of motion; an indication of occupancy; a temperature measurement; a pressure measurement; a humidity measurement; a time measurement; triggering of a security alarm; and triggering of a fire alarm.

By providing signals indicative of such events to the controller, the controller can be informed of certain parameters in any situation. The control preferences for the system may require certain devices to perform differently in different situations. Thereby a determination for the manner in which devices should be controlled can be made at the controller. This can improve the control delivered by the system.

Preferably, the one or more devices are selected from the group comprising: an access control mechanism; an environmental control system; a lighting system; a manufacturing system and a building transport system.

The controller according to the present technology can be particularly suitable for controlling a variety of devices. It is sometimes desirable to control access, transport, lighting, environmental parameters and/or manufacturing equipment, and it may be particularly advantageous to control these in a particular manner in response to certain events. Further, there can be advantages associated with providing an automated, rather than manual, system for determining control of such systems such as: control responses can be determined more quickly; there may be less chance of "human error"; or it may be more efficient to operate as an automated system. This may be particularly true when there are a large number of rules that must be considered in making the control determinations; when multiple devices have to be controlled or when it is desirable to provide control on a 24-hour basis.

Preferably, the server is operable to update the database stored on the server in response to receiving, from the controller: at least a portion of the received data indicative of the status of said group of one or more building control or access devices; or at least a portion of the record of the control of said group of one or more devices.

By updating the database stored on the server with details of the status of the devices and/or the control provided to the devices, a central record of this information can be formed. Conveniently, a system administrator may be able to audit this information by accessing the data from the server, rather than being required to communicate directly with individual controllers or devices.

Preferably, there is provided a computer-readable storage medium comprising a computer program adapted to: display to a user of such a control system the system settings governing the logic stored in the database on the server for controlling said one or more devices in response to said one or more events; and present an interface to allow the user to alter at least some of the system settings governing the logic for controlling said one or more devices in response to said one or more events.

By displaying to a user the system settings which govern the logic or rules for controlling the devices, and allowing the user to alter these, it is possible for a system administrator to change settings when required. For example, new users (i.e. details of their access card) may added to the system, or a desired temperature setting may be altered.

Preferably the computer program is further adapted to display to the user at least one of: at least a portion of the received data indicative of the status of said group of one or more devices; and at least a portion of the record of the control of said group of one or more devices.

By displaying to the user the status and/or a record of the control of the building control or access devices, it would be possible for an administrator to audit a system. For example, it may be necessary to find out which cards have been used to obtain access through a door during a certain time period.

According to another aspect of the present technology, there is provided a building or access management method for controlling a group of one or more building control or access devices in response to one or more events relevant to the group of one or more devices, the method comprising the steps of: receiving from a server updates to a local copy of a subset of a database, wherein the database is provided on the server and contains logic for controlling the one or more devices in response to the one or more events, and wherein the local copy of the subset of the database contains logic relevant to the group of one or more devices; receiving one or more signals indicative of said one or more events relevant to the group of one or more devices; and controlling the group of one or more devices in response to the one or more signals.

The present technology can provide the benefit of consolidating control of devices that would normally be controlled separately, thus providing a more capable control method.

The present technology can provide control for systems which contain a large number of devices by dividing the devices into groups and providing method of control for each group. The present technology can advantageously provide an efficient method for handling data.

By providing a method of control for a device or group of devices, without the need for control decisions to be made at a central server, response times can be improved as communications can be faster. This can provide an improved user experience as the system can exhibit a quicker response. Further, it is possible that the method can improve efficiency as communicating with a server is optimised.

Another potential advantage of the present technology is a reduction in the time required to make control decisions due to only a subset of the database being required. As the subset of the database contains less data, the logic in the subset of the database can be accessed quicker. This can provide an improved user experience as the system can exhibit a quicker response.

Further, only the data traffic from a subset of the devices in the system needs to be processed. Therefore the method should require less processing power and/or memory capacity to operate compared to a central server controlling all devices in a system and more efficient hardware can be used. Alternatively, the controller hardware can provide a reduction in response time due to more efficient use of processor and memory resources compared to a central server controlling all devices. This can provide an improved user experience as the system can exhibit a quicker response. In addition, data traffic does not need to flow between the devices and the server, so data traffic at the server can be reduced.

It is also desirable to have a quick and simple way of updating the database. By providing a database on a central server and only updating a subset of the database locally, the present technology can provide a simple mechanism to update the system by allowing an administrator to update the central database. Only the data needed to update the relevant subset of the database needs to be received locally from the server. Additionally, the server only needs to be active when the system is being updated.

According to another aspect, there is provided building or access management control logic for controlling one or more building control or access devices in a system including one or more sensors in response to one or more events, wherein the logic defines a plurality of appliance types such that appliance instances may be created, which correspond to sensors or building control or access devices; wherein the logic further defines a set of actors which interact with appliances for defining the behaviour of each appliance type; wherein the actors include at least one input value type, at least one output value type and at least one counter, timer or clock; and wherein the logic includes logic relating actors to individual appliance instances to provide control of said one or more building control or access devices.

By allocating appliance types to each building control or access device, where each appliance type has a behaviour defined by a set of actors, a generic and flexible model for defining a control system is provided. Advantageously, it is possible to customize the model for specific instances of devices. There is a distinction between each device type and the functionality applied to it, i.e. its behaviour; connections between devices and their behaviour can be readily formed in such a control system. Different systems are generally associated with different inputs, outputs and devices. E.g. heaters may be controlled by temperature sensors, whereas doors may be controlled by the detection of a credential. We have found that the technology allows actors readily to be provided which provide cross-system functionality at a point and also readily allow interoperability of complex systems, e.g. heating and access control, which had historically been controlled by different secure systems other than with limited hardwiring at sensors or complex integration at the system level.

Preferably, the appliance instance for each control or access device may be reallocated to another of said plurality of defined appliance types to alter the behaviour of said control or access device.

By reallocating different appliance types to devices, the functionality and behaviour of that device can be simply and easily altered by system administrators, and without any need to interfere with the hardware configuration of the devices.

Preferably, the logic is embodied on a computer readable storage medium.

Preferably, there is provided a building or access management controller for controlling one or more building control or access devices in a system including one or more sensors in response to one or more events, comprising: a memory operable to store said logic for controlling one or more building control or access devices; a processor operable to execute said stored logic; and one or more interfaces operable to communicate with said one or more building control or access devices or sensors.

By providing a controller for controlling storing and executing the control logic, the control of devices can be integrated at a specific controller, which has the flexibility of being able to control many different aspects of a control system.

Preferably, the actors include a counter and a timer.

By providing a counter and a timer as actors, it is possible to provide control based on the timing of events.

Preferably, the one or more building control or access devices are selected from the group comprising: an access control mechanism; an environmental control system; a lighting system; a manufacturing system and a building transport system.

The control logic according to the present technology can be particularly suitable for controlling a variety of devices. It is sometimes desirable to control access, transport, lighting, environmental parameters and/or manufacturing equipment, and it may be particularly advantageous to control these in a particular manner in response to certain events.

Further, there can be advantages associated with providing an automated, rather than manual, system for determining control of such systems such as: control responses can be determined more quickly; there may be less chance of "human error"; or it may be more efficient to operate as an automated system. This may be particularly true when there are a large number of rules that must be considered in making the control determinations; when multiple devices have to be controlled or when it is desirable to provide control on a 24-hour basis.

Preferably, each input value is indicative of one of said one or more events.

By providing input values which are indicative of the events, it is possible to control devices based on such events.

Preferably each of one or more events are selected from one or all of the group comprising: acquisition of a credential; identification of an entity; detection of user input; detection of motion; an indication of occupancy; a temperature measurement; a pressure measurement; a humidity measurement; a time measurement; triggering of a security alarm; and triggering of a fire alarm.

By providing signals indicative of such events to the controller, the controller can be informed of certain parameters in any situation. The control preferences for the system may require certain devices to perform differently in different situations. Thereby a determination for the manner in which devices should be controlled can be made at the controller. This can improve the control delivered by the system.

According to another aspect, there is provided a building or access management method for controlling one or more building control or access devices in a system including one or more sensors in response to one or more events, comprising the steps of: defining a plurality of appliance types such that appliance instances may be created, which correspond to sensors or building control or access devices; and defining a set of actors which interact with appliances for defining the behaviour of each appliance type; relating actors to individual appliance instances; and providing control of said one or more building control or access devices based on the relating of actors to individual appliance instances.

Preferably, the method further comprises the step of: reallocating the appliance instance for each control or access device to another of said plurality of defined appliance types to alter the behaviour of said control or access device.

The above embodiments and examples are to be understood as illustrative examples. Further embodiments, aspects or examples are envisaged. It is to be understood that any feature described in relation to any one embodiment, aspect or example may be used alone, or in combination with other features described, and may also be used in combination with one or more features of any other of the embodiments, aspects or examples, or any combination of any other of the embodiments, aspects or examples. Furthermore, equivalents and modifications not described above may also be employed without departing from the scope of the invention, which is defined in the accompanying claims. It will be appreciated that sub-features of each aspect may be provided in combination with each other, and though the claims have single dependencies, the features of different dependent claims may be combined without departing from the scope of the invention.

BRIEF DESCRIPTION OF THE DRAWINGS

Embodiments of the present technology will now be described, by way of example only and with reference to the accompanying drawings having like-reference numerals, in which.

DETAILED DESCRIPTION

Figure 1A:
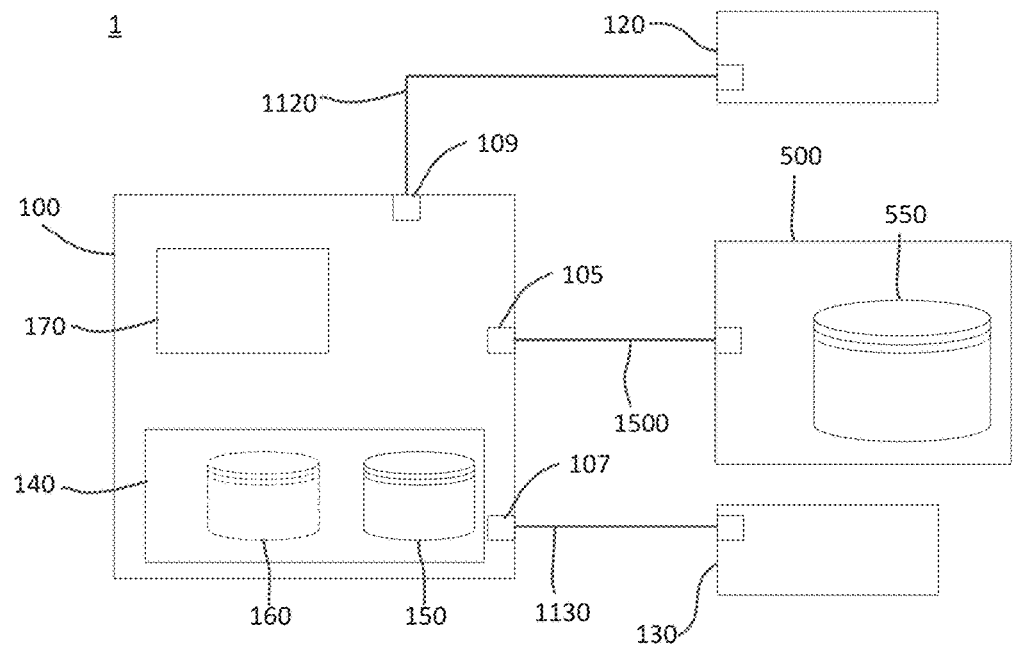
FIG. 1A illustrates a schematic diagram of a controller according to a first embodiment.

Referring to FIG. 1A, a generic control system 1 will now be described according to a first embodiment. The control system 1 can be used for controlling devices (e.g. heating and air conditioning units or access control devices) within a building or site and may be particularly useful for integrating the control of different types of devices into one system.

The control system 1 contains a controller 100, connected to a server 500 via network connection 1500. The controller is also connected to device 120 via network connection 1120, and to reader 130 via network connection 1130.

For simplicity, this first embodiment has been shown with only one controller, one device and one reader, however the system could contain multiple controllers and each controller may also be connected to multiple devices and/or readers.

Server 500 is provided with a database 550 which contains logic for controlling all devices in the control system 1. The logic may represent the control configuration for the system, such as rules specifying how controllers should behave in certain situations or in response to certain triggers or events. In situations where there are several devices of the same type, or that can perform the same function(s), designated behaviours can be assigned. For example, all doors in a control system may all be capable of opening, closing and locking, and these designated behaviours of the "door" device type can be assigned to all the doors.

The controller 100 includes a memory 140, a processor 170, an interface 105 for connecting to the server 500 via network connection 1500, an interface 107 for connecting to the device 120 via network connection 1120 and an interface 109 for connecting to the reader 130 via network connection 1130. The memory 140 stores a local copy 150 of a subset of the database 550 stored on the server 500. The local copy 150 may be a representation of a subset of the server database 550. In this example, the local copy 150 contains only the logic relevant to the device 120 and the reader 130. The memory 140 also stores a further local copy 160 of the subset of the database 550. The server 500 propagates any changes made to the database to the controller 100. The server 500 would normally minimise data transfer by only sending updates to the logic relevant to device 120 and reader 130, rather than sending the updates to the entire database 550 or an updated copy of the entire database 550. In some embodiments, the server 500 may also send regular "heartbeats", indicating its own status, to the controller 100 and the controller or controllers may send regular "heart beats" to the server.

The reader 130 detects certain events or triggers relevant to the devices in the system 1. For example, the reader 130 could be a thermistor that records the temperature in a room.

Alternatively, it could be a card reader that can obtain the credentials stored on an access card that has been touched to the reader 130.

The device 120 may be capable of performing various functions. For example, device 120 could be a heater for heating a room; or it could be an arrangement of a number of heaters for heating a large area or several rooms. The device 120 could also be a locking mechanism on a door.

The controller 100 receives signals indicative of certain parameters from the reader 130 and uses these signals to provide control commands to the device 120. The controller uses the logic stored in the local copy 150 of the subset of the database 550 to determine how to control the device 120 based on the signals received from reader 130.

For example, in climate control systems, if the controller 100 receives a signal indicating that the temperature in a room has dropped below a threshold, the controller may send a command to device 120 to increase the temperature. The details for the control, such as the temperature threshold at which heaters must be instructed to alter the temperature, may be stored as rules or logic in the local copy 150 of the subset of the database 550.

For access control, if the controller 100 receives a signal indicating that an access card with certain credentials has been presented to the reader 130, the controller 100 may use logic stored in the local copy 150 of the subset of the database 550 to determine whether a device 120, such as a magnetic lock, should be instructed to unlock a door; the controller can then send the required instructions or commands to the device 120. This logic could include, for example, a list of the credentials stored on access cards for the access system and whether the lock should be opened for each access card or credential when presented.

The controller 100 receives updates to the local copy 150 of the subset of the database 550 from the server 500. A system administrator need only alter control preferences at the server 500 for them to be propagated across all controllers in the control system 1.

The controller 100 can also store, in its memory 140, different types of operation log data; for example, an events log of controller decisions (i.e. a record of the commands provided to the device 120), and/or a current storage log containing values of counters, timers etc. The device 120 can also send details regarding its status (e.g. for a lock, whether it is locked or unlocked, or for a heater, the temperature of the water in its pipes) to the controller 100. The controller 100 may store this status in its memory 140. This memory can be an in-memory lookup table, stored separately from the local copy 150 of the subset of the database. In alternative embodiments, a separate device (e.g. reader 130) could be used to monitor the status of device 120 and send this information to the controller 100. The controller 100 may further send to the server 500 data regarding the commands sent to and/or the status of the device 120.

The local copy 150 of the subset of the database 550 is opened only in "read-only" mode. It has been found that writing to a database (e.g. performing "write" functions such as delete/insert/update) can disproportionately delay "read" access to the data stored compared to "reading" the database; by opening the local copy 150 in "read-only" mode, such delays are avoided. By decreasing the latency in the system, the logic can be accessed and searched more easily in this "read-only" local copy 150. Therefore the determination of how to control the device 120 can be performed more quickly thus the devices can be controlled more quickly in response to events.

The further local copy 160 of the subset of the database 550 may be opened in "read-write" mode. The updates to the local copy 150 of the subset of the database 550, which are received from server 500, may be written to this further local copy 160. This means that the controller 100 can continue to access the logic required for controlling the device 120 quickly, from the "read-only" local copy 150, while updates to the logic from the server 500 are recorded at the controller 100 on the "read-write" further local copy 160 of the subset of the database 550. Once updates are deemed to be completed, the updates can be transferred to the local copy 150 from the further local copy 160. This could be achieved by a file copy or rename function. Thus, delays caused by writing updates to the local copy 150 are greatly reduced, since updates are written to the local copy 150 from the further local copy 160.

The logic and/or data stored in the local copy 150 and further local copy 160 of the subset of the database 550 stored on the server 500, which are stored on the controller 100 may be organised in a different manner to that stored in the database 550 on the server 500. It can be more efficient to organise large quantities of data by categorising it in a hierarchical manner. For example, the logic relating to control systems could be categorised into device types, device functions, users, thresholds etc. However, this is not necessarily the most efficient way to enable fast searches; for this an optimised or "flattened" arrangement works better. Therefore, it can be better to store the logic in a hierarchical manner on the server 500 in the database 550, and in a "flattened" manner on the controller 100 in the local copy 150 and sometimes also in the further local copy 160 of the subset of the database 550. When this is the case, "flattening" of the data can be performed at the controller 100 once updates have been received, or at the server 500 before updates are sent. The local copy 150 and further local copy 160 of the database are identical, except that the further local copy 160 will be more up-to-date whilst updates are occurring.

Alternatively, and particularly in smaller control systems with fewer devices to control, the local copy 150 of the subset of the database need not be opened in "read-only" mode and there may be only one local copy 150 of the subset of the database on each controller 100. As the local copy 150 contains only a subset of the logic included in the database 550 on the server 500, this may improve database performance sufficiently, such that the further local copy 160 and/or "read-only" functionality are not required. It would be apparent to the skilled person which arrangement would be appropriate.

Figure 1B:
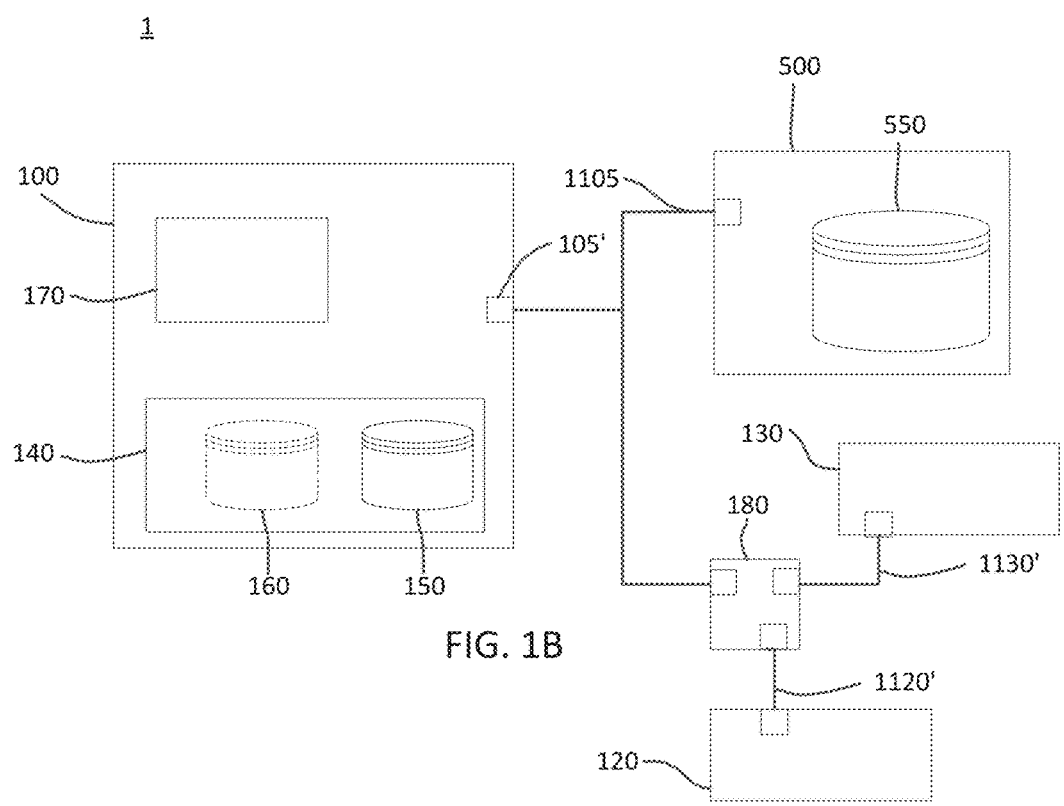
FIG. 1B illustrates a schematic diagram of an alternative embodiment of to the controller of FIG. 1A.

FIG. 1B shows an alternative embodiment of the generic control system 1, in which the controller 100 is connected via interface 105' using a single network bus connection 1105 to an input/output controller 180 and the server 500. The reader 130 and device 120 are connected to the input/output controller 180, via separate connections 1120', 1130'.

There are advantages to both arrangements; for example, the connections 1120, 1130 & 1500 of FIG. 1A, which connect controller 100 separately to the device 120, reader 130 and server 500, may provide more secure communication. In contrast, the single network connection 1105 of FIG. 1B may be simpler to implement e.g. requiring fewer cables or having the ability to use existing ones.

Various alternative implementations and combinations for connecting the controller 100 to the device 120, reader 130 and server 500 would also be apparent to the skilled person. For example, the device 120 may be connected directly to the controller 100, while the server 500 and reader 130 share the same connection to the controller 100. There may be a Local Area Network (LAN) or Wireless LAN (WLAN) to which all or some of said controller 100, device 120, reader 130 and server 500 can be connected.

The connections 1120, 1130, 1500, 1105 may be wired or wireless, or a combination of both. Wired communication could be for example via optical fibres, Ethernet cables, coaxial cables or RJ45 connectors and cables. Wireless communication may be via Bluetooth, Bluetooth Low Energy (BLE), near field communication (NFC), Infrared, high- or low-frequency radio communications, line-of-sight communications etc. Alternatively, connections 1120, 1120', 1130, 1500, 1105 could include communication over the Internet. Other types of communication known to those skilled in the art may also be suitable.

Figure 2A:
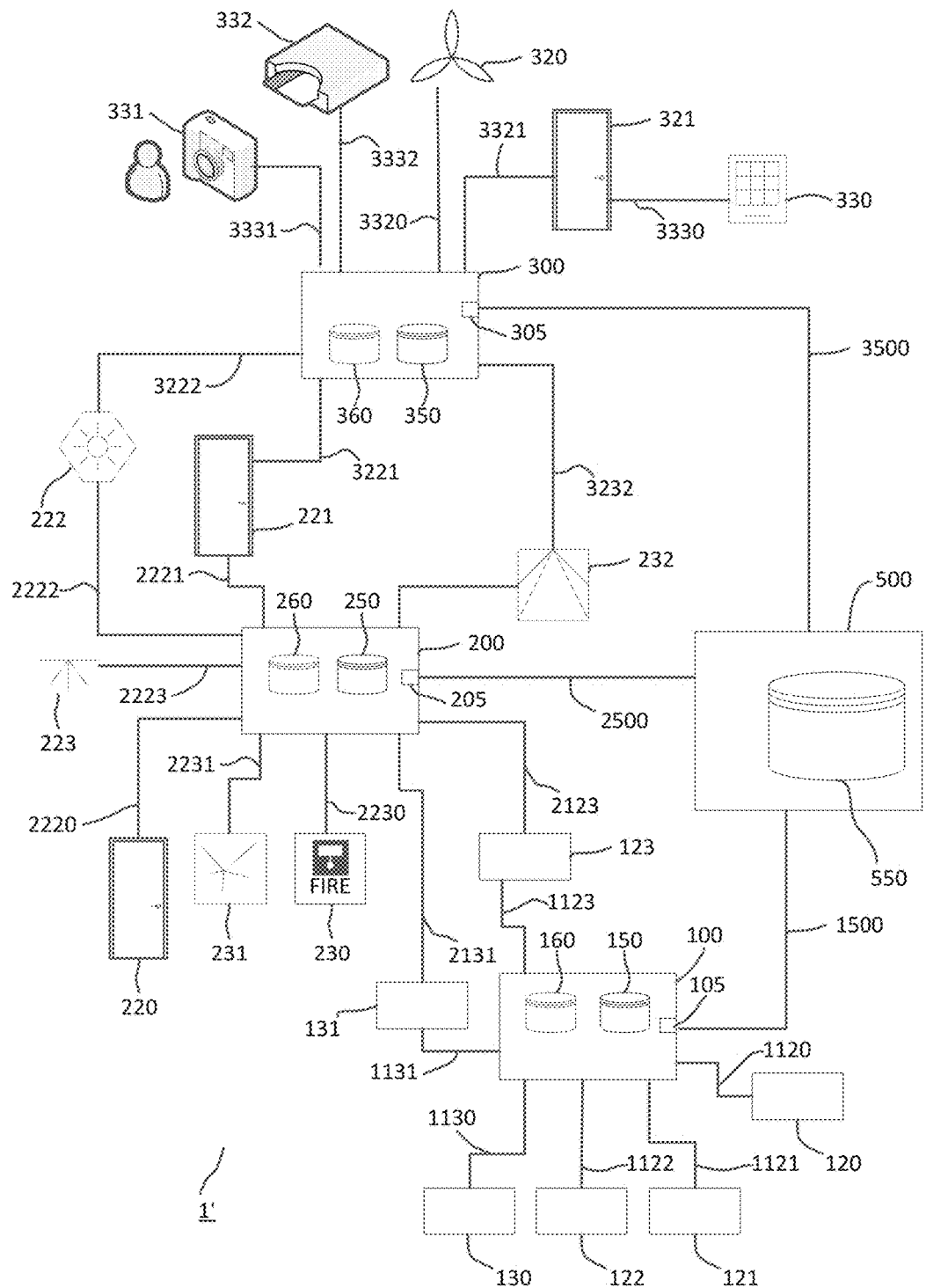
FIG. 2A illustrates a schematic diagram of a control system according to an exemplary embodiment.

Referring to FIG. 2A, an exemplary embodiment of a control system will now be described. The control system 1' controls access, climate and security control at a building or site.

The control system 1' has a server 500 connected to a first controller 100 (via interface 105 using network connection 1500), a second controller 200 (via interface 205 using network connection 2500) and a third controller 300 (via interface 305 using network connection 3500). Although three controllers are shown, it should be appreciated that it would be possible to include any number of controllers in the control system 1'.

In the control system 1', where there are many devices to be controlled, it is possible to divide the devices into groups and provide an individual controller for each group. Instead of replicating the total control logic for the entire control system on each controller, each controller only stores a subset of the total logic for the system by storing only logic for the devices connected to each controller.

The first controller 100 is connected to four devices 120, 121, 122, 123, via separate network connections 1120, 1121, 1122, 1123, and to two readers 130, 131 via separate network connections 130, 131.

The second controller 200 is connected to four devices 220, 221, 222, 223 via separate network connections 2220, 2221, 2222, 2223, and to three readers 230, 231, 232, via separate network connections 2230, 2231, 2232. The second controller 200 may also be connected, via separate links/connections 2123, 2131, to any device 123 and/or reader 131 that is also connected to the first controller 100.

The third controller 300 is connected to two devices 320, 321, via separate network connections 3320, 3321, and to two readers 331, 332, via separate network connections 3330, 3331, 3332. The reader 330 is connected to one of the devices 321 via a separate network connection 3330. Data exchanged between the third controller 300 and this reader 330 is conveyed via the intervening device 321. The third controller 300 may also be connected, via separate connections 3221, 3222, 3232, to any device 221, 222 and/or reader 232 that is also connected to the first controller 100 or the second controller 200.

Figure 2B:
FIG. 2B illustrates a schematic diagram of groupings of devices which may be controlled according to the exemplary embodiment of FIG. 2A.

FIG. 2B shows a plan of the devices in each group. Devices can be in just one, or in multiple groups. In this example, three devices 120, 121, 122 are in the first group only are they are only connected to the first controller 100; one device 123 is in both the first and the second groups, as it is connected to both the first controller 100 and second controller 200; two devices 220, 223 are in the second group only, as they are only connected to the second controller 200; two devices 221, 222 are in both the second and third groups, as they are connected to both the second controller 200 and the third controller 300; and two devices 320, 321 are in the third group only as they are only connected to the third controller 300. However, many different grouping combinations would be possible. For example, a device may be in three or more different groups.

Referring back to FIG. 2A, the server 500 includes a database 550, which contains logic for controlling the devices 120, 121, 122, 123, 220, 221, 222, 223, 320, 321 of the control system 1'.

The first controller 100 stores a local copy 150 of a first subset of the database 550 stored on the server 500. The first subset contains only the logic relevant to the first group of devices 120, 121, 122, 123 which are connected to the first controller 100. The first controller 100 may also store a further local copy 160 the first subset of the database 550 stored on the server 500.

The second controller 200 stores a local copy 250 of a second subset of the database 550 stored on the server 500. The second subset contains only the logic relevant to the second group of devices 123, 220, 221, 222, 223 which are in communication with the second controller 200. The second controller 200 may also store a further local copy 260 the second subset of the database 550 stored on the server 500.

The third controller 300 stores a local copy 350 of a third subset of the database 550 stored on the server 500. The third subset contains only the logic relevant to the second group of devices 221, 222, 320, 321 which are in communication with the third controller 300. The third controller 300 may also store a further local copy 360 of the third subset of the database 550 stored on the server 500.

Storing only logic for the devices connected to each controller makes the provision of control for the system much more efficient. Having a smaller quantity of data can increase the speed with which the controller can access and search through the logic stored, and hence reduce the response time for providing control to the devices.

The readers 130, 131, 230, 231, 232, 330, 331, 332 can detect certain parameters that may be useful for controlling the devices 120, 121, 122, 123, 220, 221, 222, 223, 320, 321 of the control system 1'. The readers 130, 131, 230, 231, 232, 330, 331, 332 send signals indicating the parameters they have detected to the controllers 100, 200, 300 to which they are connected.

In this embodiment, one reader 230, connected to the second controller 200, is a fire alarm 230. This could be automatic e.g. smoke or heat detector, or manual e.g. a button or a "pull" or break glass station.

Another reader 231, connected to the second controller 200, is a glass break sensor 231, which can detect when glass is broken.

Another reader 232, connected to the second controller 200 and to the third controller 300, is a presence detection sensor 232. This may include light beams, passive infrared sensors, ultrasonic or microwave sensors, which can detect the presence of moving objects (in particular, human presence). The presence detection sensor 232 may even be able to identify individuals based on physiological indicators, such as face or gait recognition.

The reader 330, which is connected to the third controller 300 via a device 321, is a keypad 330. A user may use the keypad 330 to enter a code.

Another reader 331, connected to the third controller 300, is a camera 331, which may be used to obtain an image of a user.

Another reader 332, connected to the third controller 300, is a card reader 332, which may be used to obtain credentials stored on a user's access card.

The devices 120, 121, 122, 123, 220, 221, 222, 223, 320, 321 of the control system 1' may be capable of performing various functions.

In this embodiment, one device 220, connected to the second controller 200, is a first door control mechanism 220, which can be used to open or close a first door. A door control mechanism may simply unlock a door, so that it can be opened by a user or it may include a motor for automatically opening and/or closing the door.

Another device 221, connected to the second controller 200 and to the third controller 300, is a second door control mechanism 221, which can be used to open/close a second door.

One device 321, connected to the third controller 300, is a third door control mechanism 321, which can be used to open/close a third door.

Another device 222, connected to the second controller 200 and to the third controller 300, is a light 222.

Another device 223, connected to the second controller 200, is a sprinkler system 223, which may be suitable for suppressing (or preventing) fire.

One device 320, connected to the third controller 300, is a climate control unit 320, such as an air conditioning, heating or ventilation unit.

The readers 130, 131, 230, 231, 232, 330, 331, 332 can send signals indicative of certain events to the controllers 100, 200, 300 with which they are in communication; for example, they may send indications of conditions that have been detected.

In one example situation, the fire alarm 230 can send a signal indicating that a fire has been detected to the second controller 200; the signal might indicate that the fire alarm 230 has detected smoke or heat, or that a user has pushed a button, pulled a lever or broken glass to set off the firm alarm 230. The second controller 200 can then use the logic contained in the local copy 250 of the second subset of the database 550 to determine how the second group of devices 123, 220, 221, 222, 223 should be controlled in the case of fire.

Based on this, the second controller 200 may send instructions to the first door control mechanism 220 to close the first door, since it may be helpful to close inside doors to prevent the spreading of fire. The second controller 200 may send a control command to the second door control mechanism 221 to unlock the second door, in order to allow people to evacuate the building freely. The second controller 200 could also send control commands to turn on the sprinkler system 223 to help contain the fire. The second controller 200 could also send a command over the network to the first and third controllers 100,300, to instruct devices under their control to activate.

In another example situation, glass break sensor 231 may detect that a window has been broken, which could be an indication that intruders have broken into the building. The glass break sensor 231 would send a signal indicating the glass has been broken to the second controller 200. Based on this, the second controller 200 may send a signal instructing the light 222 to turn on, so that intruders can be detected and/or deterred. The second controller 200 could also send a command to turn on a security alarm, or inform a security guard that the window has been broken.

In an alternative example situation, presence detection sensor 232 may detect that someone is present in a room, and send an indication of this to the second controller 200. The second controller 200 may then use the logic contained in the local copy 250 of the second subset of the database 550 to determine how the second group of devices 123, 220, 221, 222, 223 should be controlled. If the indication is during normal working hours, the system settings stored in the logic may specify that the second group of devices 123, 220, 221, 222, 223 need not be changed and the second controller 200 will take no action. However, if the indication is in the middle of the night the second controller 200 may determine, through using the logic, that this presence is unexpected and that the light 222 should be turned on and a security guard should be informed.

Presence detection sensor 232 may also send an indication that someone is present in a room to the third controller 300. The control preferences for the system may be such that whenever someone is present in a room, the room should be kept at a certain temperature. In heating the room, an instantaneous control response may be less important than in opening doors or switching on lights. Therefore, the third controller 300 may not store details of how the heating should be controlled in the local copy 350 of the subset of the database; it may be necessary to contact the server 500, by sending a message or request with details of the event (i.e. that someone is present in the room) and that further rules or logic which are not stored in the local copy 350 of the subset of the database are required. In response, the server 500 may send data containing this further logic to the third controller 300. This may also require the database 550 stored on the server 500 to be updated. The controller determine how the heating should be controlled from this logic and send a control instruction to climate control unit 320 to turn on, increase/decrease the temperature etc. In alternative implementations, the server 500 may determine how the heating should be controlled and send this command either back to the third controller 300, which can relay it to the climate control unit 320, or directly to the heating control unit 320 itself. Some systems may be able to identify certain individuals, and control the climate based on this identification. For example, some people may prefer the room to be hotter than others.

In terms of access control, an individual wishing to enter the building may enter an access code or PIN into the keypad 330, which may send an indication of this code or PIN, via the third door control mechanism 321, to the third controller 300. The third controller 300 may store logic, which determines how the third door control mechanism 321 should be controlled. For example, a certain code may allow access to the building at all times of day, while another code may only allow access during working hours. The third controller 300 would be able to determine this from the signal received from keypad 330, the time and the logic stored in the local copy of the third subset of the database 550. The third controller 300 can then instruct the third door control mechanism 321 to unlock or open the third door.

Alternatively, the camera 331 may be used to identify individuals who wish to pass through the door. For example, the camera 331 may take an image of a user's face or eye and send this to the third controller 300. The local copy 350 of the third subset of the database may contain logic to identify an individual based on this image, and further logic which determines whether or not the individual should be allowed to pass through the third door.

In yet another example, a user may be supplied with an access card, which contains certain credentials. The user can present their card to the card reader 332, which will be able to obtain at least some of the credentials stored on the card. The card reader 332 may send an indication of these credentials to the third controller 300, which uses this information to determine how the third door control mechanism 321 should be controlled. The local copy 350 of the subset of the database stored on the third controller 300 may contain a "blacklist" of cards which are denied access to the door, so that the third controller 300 can rapidly determine whether the door should remain locked. Alternatively, a "whitelist" of known cards can be stored in the local copy 350.

Having a smaller quantity of data can increase the speed with which the controller can access and search through the logic stored, and hence reduce the response time for providing control to the devices. The amount of logic stored on each controller can be further reduced by storing only logic for certain functionalities of the devices. For example, the second controller 200 may store logic only for controlling the second door control mechanism 221 in emergency situations, where it may be useful to unlock the second door very quickly to allow people to evacuate a building, but the door should not be opened, to prevent the spread of fire. In this situation, the second controller 200 may only store logic relating to unlocking performed by the second door control mechanism, and not to opening the second door. Whereas, the rules or logic for controlling the second door control mechanism 221 in non-emergency door operations, where it may be preferable for the second door to be both unlocked and opened when an authorised user wishes to pass through the door, may be stored in the database 550 at the server 500, or in the third local copy 350 of the subset of the database on the third controller 300. The third controller 300 may store logic related to both the opening and unlocking functionalities performed by the second door control mechanism 221.

Each controller 100, 200, 300 may receive updates from the server 500. These updates may be regularly propagated to the controllers via the network connections 1500, 2500, 3500. The updates may occur periodically at pre-set times, or they may occur when changes have been made to the logic in the database 550 stored on the server 500. One advantage to a control system built according to the present invention is that since less logic is stored on each controller, fewer and/or smaller updates need to be sent compared to a system where controllers stored copies of the entire database 550. When fewer and/or smaller updates are sent from the server 500 to each controller 100, 200, 300, it takes less time to receive them and less time to write them to the local copy 150, 250, 350 of the subset stored. Since writing to a database can reduce access to the data stored, having to write fewer updates means access is reduced for a shorter time. Additionally, a complete update can be propagated across the system faster, so all controllers will be using up-to-date logic more quickly.

There may also be provided a user interface for displaying system settings governing the logic for controlling said the devices in response to certain events and to allow a user to alter these system settings. The user may be a system administrator or other certified user who may view these settings via the user interface by direct or remote communication with the server 500. Thus, the rules or system settings described by the logic in the database 550 stored on the server 500 may be displayed and altered. Alternatively, it may be possible for a user interface to display the settings or logic stored in the local copy 150, 250, 350 of the database stored on each controller 100, 200, 300.

The controllers 100, 200, 300 may store a record of the control commands they have sent to the devices. This record may be stored in the local copy of the subset of the database, in the further local copy of the subset of the database, or elsewhere on the controller 100, 200, 300. The record may be useful because certain control preferences or system settings could be based on previous commands.

It may also be possible for devices 120, 121, 122, 123, 220, 221, 222, 223, 320, 321 to send an indication of their status to any controller 100, 200, 300 they are in communication with. For example, the first door control mechanism 220 may be able to send an indication of whether the second door is open or closed to the second controller 200. This may be useful when determining whether or not to send a command to open (or close) the door.

The controllers 100, 200, 300 may also send to the server 500 a record relating to control commands sent to the devices 120, 121, 122, 123, 220, 221, 222, 223, 320, 321. It may be useful to have this central record of control commands that have been issued. For example, a system administrator may wish to obtain a record of the occasions on which a certain door has been opened by a certain individual. By sending a record of this to the server 500, the system administrator need only check the record in one location. The user interface described above may be used to display to the certified user or system administrator some of the received data indicative of the status of the devices or a record of the control commands sent to the said group of one or more devices.

The server 500 may also send a record of certain control commands to other controllers. It may be useful for one controller to be aware of the commands being issued by other controllers in the control system 1', as it may be possible to use this information, combined with the logic which is already stored, to control devices. For example, if the second controller 200 has sent a command that the light 222 should remain on due to an emergency situation, the second controller 200 may send a record of this to the server 500. The server 500 may then relay this information to the third controller 300. The third controller 300 may use this to override certain rules in the third subset of the database 550, for example that the light 222 should be switched off when a user leaves a room.

Sending a record of control commands to the server 500 may also negate the need for the individual controllers 100, 200, 300 to store this information. This means the memories of the controllers 100, 200, 300 can be smaller and the processors less powerful. Cheaper controllers can be used. Controllers of a smaller size may also be used, which would be useful in cases where controllers should be placed near the devices they are operable to control. Another advantage is that when there is less data stored on the controller, any data (in particular the logic for determining how devices should be controlled) that is stored can be accessed more quickly.

Figure 3:
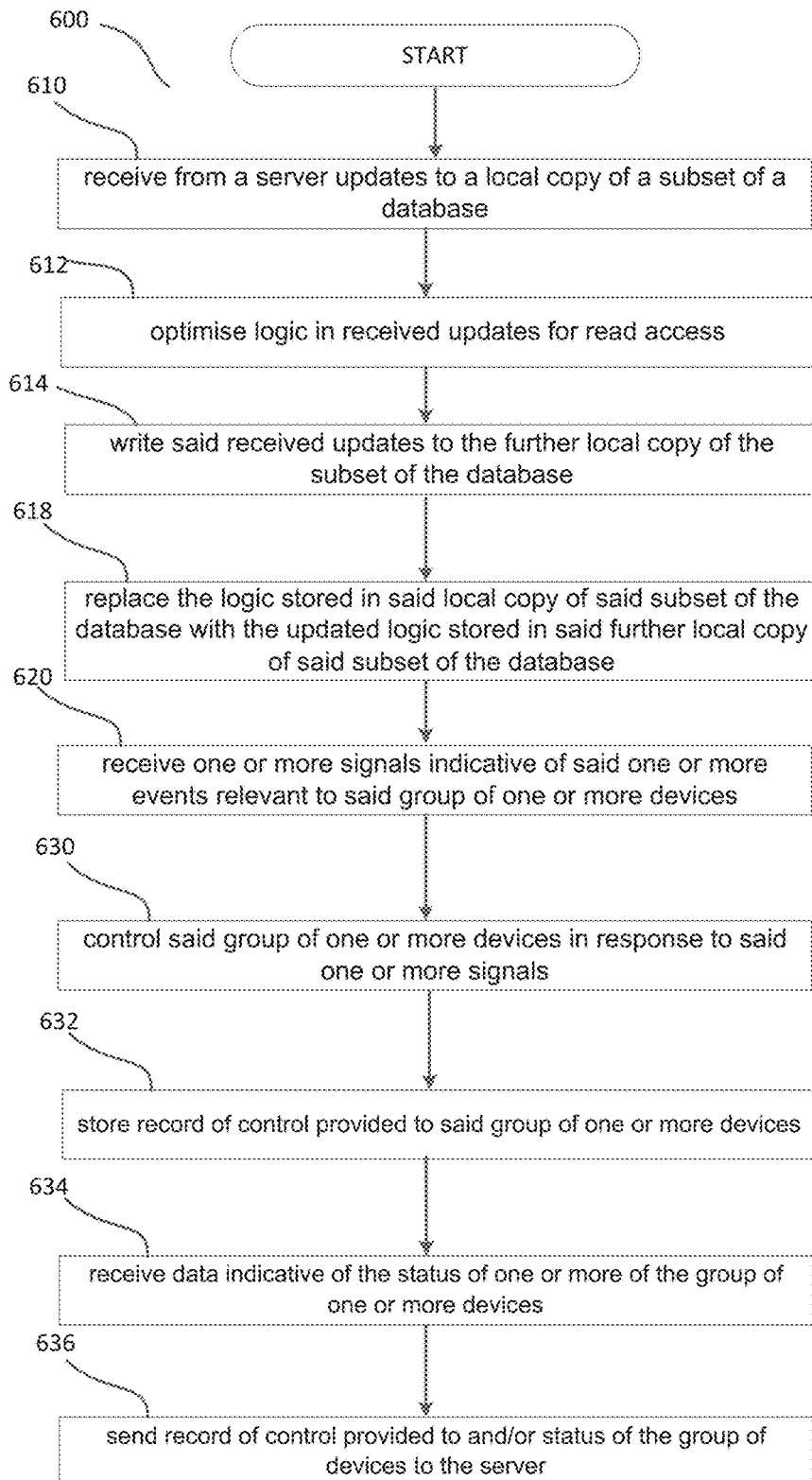
FIG. 3 illustrates a methodology for controlling devices according to a specific embodiment.

Referring to FIG. 3, a method 600 for controlling devices at a controller 100 according to the embodiment of FIG. 2A will now be described.

At step 610, the controller 100 receives from a server 500 updates to a local copy 150 of a first subset of a database 550. The local copy 150 of the subset of the database holds logic for controlling a first group of devices 120, 121, 122, 123. An update to the local copy 150 of the first subset of the database may be sent from the server 500 when a system administrator changes system settings for the control system 1'.

For example, a new user may be added, and the updated logic may include details of the new user's access card and which doors the user should be allowed to open. In some examples, the logic of the entire subset is sent (this may mean the server 500 does not need to keep a record of which logic has changed since the previous update). In other examples, only the changes (replacements/insertions/deletions) are sent (this may mean the server 500 must keep a record of which updates have already been sent to each controller, but fewer updates will be sent to the controllers, so there would be less traffic on the network and less processing required at the controllers).

At step 612, the controller 100 optimises or "flattens" the logic which is received in the updates. The logic stored in the database 550 on the server 500 may be stored in a different format to the logic stored in the local copy 150 of the subset of the database on the controller 100.

For example, the logic relating to control systems could be categorised into device types and their functions, users, thresholds etc. However, for the logic on the controller 100, which should be arranged so that it can be searched quickly. For example, the data may be stored on the controller in a "flattened" arrangement, by grouping or associating data items such as users, appliances, device types etc which can facilitate faster sequential reading of related data. This arrangement of data can speed up the processing of and access to data at the controller. "Flattening" of the data may be performed at the controller 100 to convert the data into a format that is read-optimised, for storage in the local copy 150 of the subset of the database.

In step 614, the updates are written to the further local copy 160 of the subset of the database 550. Writing to a database can slow down access to the data, so by writing the updates to a further local copy 160, the local copy 150 can continue to be used for efficient access to the control logic even while updates are being received by the controller 100.

In step 618, the logic stored in the local copy 150 of the subset of the database 550 is replaced with the updated logic that was stored in the further local copy 160 in step 614. This step 618 may comprise a file copy/file rename function in which the local copy 150 is simply replaced with an exact replica of the further local copy 160. Alternatively, the step 618 may comprise updating only the sections of the logic that have been updated in the further local copy 160, i.e. those sections that now differ from the local copy 150.

In step 620, one or more signals indicative of said one or more events relevant to the first group of one or more devices is received. These signals are received, for example, from a reader 130.

In step 630, the first group of one or more devices is controlled in response to the one or more signals received in step 620. This control may take the form of sending instructions or commands indicating actions one or more of the devices should perform. The manner in which the devices should be controlled can be determined from the logic stored in the local copy 150 of the database and the signals received. For example, there may be a rule that if a certain event occurs, then a specific device should perform a certain action.

In step 632, the controller 100 may store a record of the control provided to the devices in step 630. This record may be stored on the memory 170 in a separate location to the local copy 150 of the subset of the database. By storing data relating to the live control of the devices separately from the predetermined logic governing the control of the devices, the local copy of the subset of the database can be kept as concise as possible. Writing to a database can also interfere with access to the data stored. Therefore, storing live control or status information separately from the logic can mean the controller can access the logic faster and may be able to make control determinations more quickly.

In step 634, the controller 100 may receive updates indicative of the status of one or more of the first group of one or more devices. This may be helpful for determining what control commands should be sent to the devices; for example, sending a command to switch on a light that was already on, or to open a door that was already open, would be superfluous. Hence, informing the controller about status of the devices it is operable to command can reduce the flow of control commands on the system, which may make it work more efficiently.

In step 636, the controller 100 may send a record of the control provided to and/or the status of the first group of devices to the server 500. It may be useful to have records of these for all the devices in the system stored centrally on the server 500; for example, it would be easier for a system administrator to access this information if it were all stored on the server. It would also be possible for the server 500 to send this information on to other controllers, where it may be useful for determining how they should control any devices to which they are connected.

In a simple, specific embodiment, the database sent to all controllers is exactly the same database in form and data content. This database is constructed and maintained on the server, and is itself a subset of the main server database. All controllers would have access to all the configuration of all other controllers.

In each controller, the live local copy of the subset of the database 150 may contain a set of SQL scripted responses to the events that result in actions on counters, timers, and output instructions back to input/output (IO) devices. To implement this processing, the actual IO events and actions are translated into actions on abstract entities called "appliances". These "appliances" may correspond to actual, physical devices, such as a door, without directly prescribing the associated IO.

Referring to the control system shown in FIG. 1B, the IO controller 180 represents the interface between the hardware signals (lock outputs, exits buttons etc,) and the event processing system of the controller 100. Ultimately, there may be a wide variety of controllers, each with different capabilities of IO ports etc. The IO controller 180 exhibits no intelligent behaviour of its own, other than managing communications.

The reader 130 also exhibits no intelligent behaviour of its own; its purpose is, for example, to interrogate physical credentials to identify their unique identification. It can then communicate this to the controller 100 via the IO controller 180 as an event to be processed by the event processing system of the controller.

The controller's live local copy 150 of the subset of the database may be aware of 3 primary pieces of information:
- The hardware devices (e.g. door connector, reader) available to the controller 100. In certain examples, these may be referred to as IO connectors.
- The domain models expected to be implemented of these hardware devices. There are, in general, two types of domain models; "appliances" (e.g. devices such as doors, turnstiles or lifts) and "triggers and actions" (e.g. events such as a user pressing a button). The term "trigger and action" is used to describe user-defined behaviour that may extend or modify an appliance's intrinsic behaviour. Customers or system administrators could, for example, add a rule of their own that if the count of users through a particular door exceeds 100 in any 1 hour period, then another door is opened automatically.
- The full behaviour of the system 1, i.e. defined responses to events and conditions that should be implemented in the controller 100 to assign a particular "appliance type" to one or more hardware devices (or IO connectors), each being a particular "appliance instance". By storing the behaviour of devices in this way, it is simple to update any user-defined "triggers and actions" for devices at the server 500, because each appliance type can be listed as being capable of a predefined set of actions (e.g. a door may be opened or unlocked), to which predefined triggers can easily be linked. In some situations a particular "trigger and action" behaviour may only need to be updated against one appliance type in order to change the behaviour of all devices of this type (i.e. appliance instances). In addition, this makes it quicker and simpler to propagate updates to individual controllers because only the update describing the link between a trigger that has already been defined in the appliance behaviour type and a predefined action may need be sent to the controller to update the behaviour details for an appliance instance. Updates become particularly simple when a "trigger and action" is assigned to all appliances of the same type, as only the update to the appliance type behaviour need sent to a controller for all devices or appliance instances of this type stored in the local copy 150 of the database to be updated.

This information may be stored in a mapping table format in the local copy 150 of the subset of the database on the controller 100.

Figure 4:
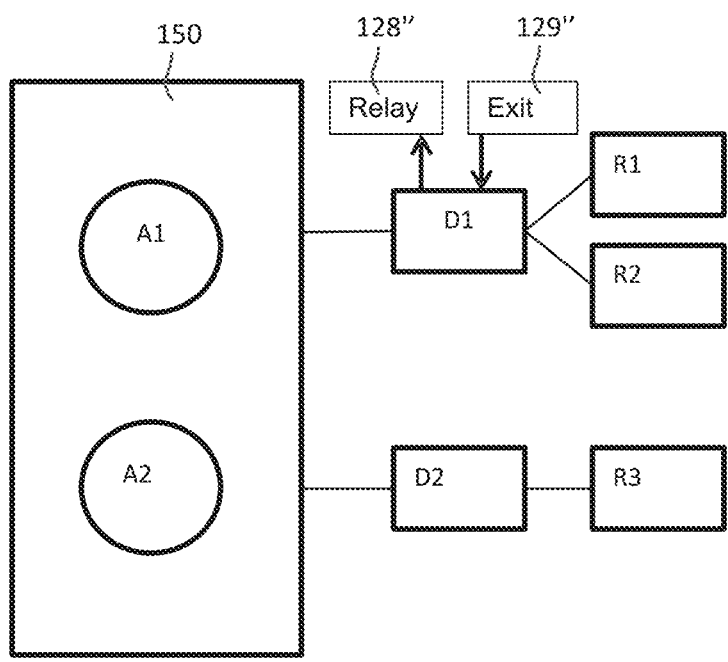
FIG. 4 illustrates a schematic diagram of a control system according to a further alternative specific embodiment.

Referring to FIG. 4, an example of information flow in the controller's local copy of the subset of the database will now be described. It will be appreciated that this information flow could occur in any of the controllers in any of the control systems described herein.

The local copy of the subset of the database contains, in this example, two domain models (or appliance types) for appliances or devices; a door A1 and a barrier A2. Linked to these are two hardware devices; a door connector D1 and a barrier connector D2, which have one or more IO ports attached. The door connector D1 has one IO port an exit button input 129" and another IO port a relay output 128". In this example, the door connector D1 also has two reader ports, to which hardware devices such as readers R1, R2 can be attached, and the barrier connector D2 has one reader port, to which a hardware device such as a reader R3 can be attached.

An example of the usage of the exit button 129" will now be described. When it is detected that a user has pressed the exit button 129", an event notification is sent to the controller, which communicates the source of the event (e.g. the door connector D1), the type of event (e.g. exit button input 129") and the value (e.g. "1" for on). The controller takes this information and may examine the mapping tables stored in the local copy 150 of the subset of the database to see what appliance model/type this relates to. In this case, the appliance model is the door A1. Some scripting code will then be run to model the behaviour associated with an exit button. This code will be "boiler-plate" code (sections of code that may be included in many places with little or no alteration) that is specific to the appliance type being modelled (a door). Running this script will create appliance-related actions. In this case, there will be an "open door" appliance command. The controller will then use the mapping table to determine which hardware device should receive this command (e.g. in this case a command to the door connector D1 to drive the lock on the door A1).

A further example of the usage of this system with one of the readers R1, connected to the door connector D1, will now be described. When a user presents a credential (e.g. an identifier stored on an access card) at the door A1, an event message containing the source (e.g. the reader R1), the event type (e.g. "credential presented") and the credential value is sent to the controller. The controller associates the credential event source (reader R1) with the door appliance A1 and runs an appliance script associated with a credential. In this case, the script may cover an assessment of permissions, times etc. If the credential is valid and entry is permitted, the result of the event processing would be an action to drive the relay 128" on the door connector D1.

In the above examples in relation to FIG. 4, the door A1 (an appliance or device) was opened based on a button being pressed, or a credential being presented (events or actors associated with the appliance). It is useful to generalise such a system according to the present invention.

An appliance (or output device) can be defined as a particular instance of an appliance type with type ID. An appliance type in turn has a defined set of 'actors' (e.g. events or commands) associated with it.

An actor can be a source of data that could have an impact on the behaviour of the appliance. For example:

An input value event, e.g. a digital 1 or 0 (expressed as '1' and a '0') value that is input into the appliance. The input actor can raises an event when its value changes, which can trigger a script to run.

An output value event, e.g. represented by a digital 1 or 0 value that is output from the appliance.

A timer may be started from within the script with a prescribed expiry time. A Timer actor stores an expiry time value and can raise an event when the timer expires.

A stopwatch timer, e.g. a timer that may be started/stopped/continued in order to measure and aggregate durations. It does not necessarily raise an event or have a pre-determined limit.

A counter, which may be started and maintained as a run time value associated with the appliance. The counter value may be modified and checked in script executions, which may result in further script processing. The counter does not necessarily have a pre-determined limit.

A reference value, e.g. a numeric or string value that is configured for a particular instance of an appliance at the user interface for example. This value may then be used in the script execution to achieve instance-specific behaviour. Reference actors individualise the behaviour of each appliance instance.

An immediate command, e.g. a manually invoked event that is used to invoke a scripted response in request to a user invoked action. For example; open door (manually open door), identify (flash LEDs so installer can see unit).

Another element of the control system 1, as shown in FIG. 1B, is the IO connectors (e.g. IO controller 180, reader 130). IO connectors are the hardware devices that are connected to the controller 100 and capable of receiving and/or generating events in the scripted event processing system. The IO connectors can represent the hardware onto which appliances may be mapped. Like an appliance, the hardware is associated with actors, but unlike an appliance, these actors can only be input or output signals; there are no timers, counters etc.

Appliance instances, each of an appliance type, are associated with a set of actors. IO Connector instances, each of an IO connector type, are associated a different set of actors. The user interface allows these two realms to be correctly mapped together to assign the required system behaviour onto the available hardware. This means correlating the appliance actors to the IO connector actors in the system.

In some embodiments, a single IO connector signal can only be mapped on to a single appliance signal or not mapped at all. However, there is no particular restriction on which IO connectors are mapped on to a single appliance; an appliance may be mapped on to different parts of multiple IO Connectors, if that seems appropriate. The actor types on the appliance side and the IO connector side must match; an input must be mapped to an input, and an output must be mapped on to an output.

Each appliance type may be associated with a defined set of scripts that determine the response of that appliance type to the different actor events outlined above. Each script may be written in standard query language (SQL), but with an extended range of SQL commands to provide access from within the script to data and operations outside of the database, like reading the input values and writing output values. In addition to these, the scripted SQL commands have full access to the local copy 150 of the subset of the database, and so have access to permissions, time constraints, credentials database and all other configuration data (i.e. control preferences or system settings which may have been set by a system administrator).

Each individual SQL script may be associated with event actors of an appliance. For example, each script could be used to do the following:
  Qualify the event
  Check other appliance run-time or database conditions
  Check configuration (permissions etc.) data
  Generate output actions
  Start timers
  Start/Stop/Reset Stopwatch timers
  Set/modify/check counters The generation of commands for appliances can be known as a trigger and action (T&A), which generally means that the trigger (i.e. an event identified by the first actor) will cause an appliance to perform an action (i.e. a command identified by the second actor).

Common Actors Between Appliances

The range of actors that are available to define an appliance could be limited; across multiple appliance types, actors that perform the same function should be assigned the same actor. If a door has an 'exit' button, and a turnstile has an 'exit' button, then they should both have an 'exit'. There shouldn't be separate 'turnstile_exit' and 'door_exit' actors declared. The reason for this is to allow any over-arching trigger and action that may be defined to be able to refer to an actor called 'exit', in the knowledge that it will apply to all appliances that are referred to by the T&A.

Behaviour Sharing Mechanisms

The scripting engine can be made flexible by the interaction that can be achieved via the scripting syntax itself, and also the manner in which the supporting database tables are organised.

The live run time data (counters, timers, input, and output) and the configuration database (i.e. local copy 150 of the subset of the database on the controller) are both accessible to appliance behaviour scripts and also trigger and action scripts. There is no restriction to the access from any script execution.

A Behaviour Activation Type may be associated with a Behaviour, in which case it supports a single trigger and action type. The trigger and action execution will be invoked in addition to the underlying appliance behaviour activation.

Alternatively a Behaviour Activation Type may be unaffiliated, in which case any appliance is executed against its native appliance behaviour. Multiple appliance types may be added to the same Activation instance, but when they are invoked they action the implicit Behaviour defined by that appliance type.

For example, a Door Permission (a Behaviour Activation type) may have door types, turnstiles, barriers and so on. The resource information that is available to the Door Permission (users, appliances, time constraints) is common to all types. There should be no appliance that is allowed into the Activation instance that expects a different resource type (identified by script reference).

Shared Event Actors

The range of actors that an appliance depends on should share the pre-existing actor range as much as possible. If a new appliance is created, which also has an exit button, it should use the existing exit button actor ID. New Actors may need to be generated, but by trying as hard as possible to use the existing meanings enriches the capability of trigger and action scripts. Consider, for example a T&A that has the following logic:—

"If Exit is pressed for any appliances in group X and "Intruder Alerted" flag is set, then Email or Telephone administrator Y."

This will require the Exit actor to be the same numeric value across all appliances (i.e. the appliances in group X), and it would be undermined by an appliance that has had its own Exit actor defined.

A peripheral can also be associated with a single actor, and a single appliance instance. A peripheral is a securable object, which is a child of an appliance securable object through the Nested Securable Object table. As a securable object, a peripheral may be assigned to a permission in place of the owning appliance to provide a lower level resolution of permitted appliance behaviour.

Although currently the readers of a door appliance are the only peripherals described in this embodiment, the concept has wider applicability. It may be decided, for example, for a barrier to have a manual open button that is operational in the weekends but not during the weekday. In this case the barrier appliance would own a peripheral securable object that mapped on to the manual open button input. Then there could be two separate permissions, one for the reader peripheral, and one for the manual button peripheral.

As the peripheral is a separate securable object, when the event is first processed, and lookups in the local copy 150 of the subset of the database are made, the mapped securable object will be the peripheral object, not the owning appliance. For example, in an appliance mapping table, there may be an Appliance Id column and also an Appliance Activation Id column. The Appliance Activation Id will be the Peripheral's Id (e.g. reader R1), and the Appliance Id will be the peripheral's immediate parent appliance ID (e.g. door A1). It is the parent appliance (e.g. door A1) that then determines the overall scripted behaviour.

In any of the embodiments, various databases can be used such as SQL, SQlite, SQLExpress or other such database software.

Any system feature as described herein may also be provided as a method feature, and vice versa. As used herein, means plus function features may be expressed alternatively in terms of their corresponding structure.

Any feature in one aspect of the invention may be applied to other aspects of the invention, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

The invention claimed is:

1. A building or access management controller for controlling one or more devices, comprising one or both of building control devices or access devices, the controlling in response to one or more events, the building or access management controller comprising:
   an interface operable to communicate with a server, wherein a database is provided on the server, and wherein the database contains logic for controlling said one or more devices in response to said one or more events; and
   a memory operable to store:
      a local copy of a subset of the database, the subset of the database containing logic relevant to a group of said one or more devices; and
      a further local copy of said subset of the database;
   wherein the building or access management controller is configured to receive, from the server, updates for said local copy of said subset of the database;
   wherein the building or access management controller is configured to write said received updates to the further local copy of the subset of the database;
   wherein the building or access management controller is configured to replace the logic stored in said local copy of said subset of the database with updated logic stored in said further local cop, of said subset of the database;
   wherein the building or access management controller is operable to receive one or more signals indicative of said one or more events relevant to said group of said one or more devices;
   wherein the building or access management controller is operable to control said group of said one or more devices in response to said one or more signals; and
   wherein the building or access management controller is configured to control, in response to at least some of said one or more events and based on read-only access to the local copy of the subset of the database, at least some of said group of said one or more devices.

2. The building or access management controller of claim 1, wherein the logic contained in the local copy of the database stored on the controller is optimized for read access by storing the logic in a read-optimized arrangement different to the arrangement of the logic in the database provided on the server.

3. The building or access management controller of claim 1 wherein, when communications with the server are unavailable, the memory is operable to store a cache of at least one of:
   data to be sent to the server; and
   data received from the server.

4. The building or access management controller of claim 1, wherein the building or access management controller is configured to receive data indicative of the status of said group of said one or more devices.

5. The building or access management controller of claim 4, wherein the memory is operable to store, in a location separate from the local copy of the subset of the database, at least a portion of the received data indicative of the status of said group of said one or more devices.

6. The building or access management controller of claim 1, wherein the building or access management controller is configured to store, in a location separate from the local copy of the subset of the database, a record of the control of said group of said one or more devices.

7. The building or access management controller of claim 1, wherein the one or more events comprise one or more of: acquisition of a credential; identification of an entity; detection of user input; detection of motion; an indication of occupancy; a temperature measurement; a pressure measurement; a humidity measurement; a time measurement; triggering of a security alarm; triggering of a fire alarm, or any combination thereof.

8. A building or access management system for controlling one or more building control or access devices in response to one or more events, the system comprising:
   a server; and
   one or more controllers, including the building or access management controller of claim 1, each for controlling a respective group of said one or more devices.

9. One or more non-transitory computer-readable storage mediums storing computer-executable instructions that, when executed by one or more computing systems, each having a processor, and at least one of the computing systems including a building or access management controller comprising an interface and a memory, cause the one or more computing systems to perform operations, the operations comprising: displaying system settings governing the logic stored in the database on the server for controlling said one or more devices in response to said one or more events; presenting an interface to allow the user to alter at least some of the system settings governing the logic for controlling said one or more devices in response to said one or more events; communicating with a server, wherein a database is provided on the server, and wherein the database contains logic for controlling said one or more devices in response to one or more events; storing a local copy of a subset of the database, the subset of the database containing logic relevant to a group of said one or more devices; receiving, from the server, updates to said local copy of said subset of the database; writing said received updates to the further local copy of the subset of the database; replacing at least some of the logic stored in said local copy of said subset of the database with updated logic stored in said further local copy of said subset of the database: receiving one or more signals indicative of said one or more events relevant to said group of said one or more devices; and controlling, in response to at least some of said one or more events and based on read-only access to the local copy of the subset of the database, at least some of said group of said one or more devices.

10. A building or access management method for controlling a group of one or more building control or access devices in response to one or more events relevant to said group of one or more building control or access devices, the method comprising:
   receiving, from a server, updates to a local copy of a subset of a database, wherein the database is provided on the server and contains logic for controlling said one or more building control or access devices in response to said one or more events, and wherein the local copy of the subset of the database contains logic relevant to said group of one or more building control or access devices;
   writing said received updates to a further local copy of the subset of the database;

replacing at least some of the logic stored in said local copy of said subset of the database with at least some updated logic stored in said further local copy of said subset of the database;

receiving one or more signals indicative of said one or more events relevant to said group of one or more building control or access devices; and controlling, in response to said one or more signals and based on read-only access to the local copy of the subset of the database in response to at least some of said one or more events, said group of one or more building control or access devices.

11. The method of claim 10, further comprising, based on the read-only access to the local copy of the subset of the database and in response to receiving one or more signals indicative of at least some of said one or more events:

identifying that the logic stored in the local copy of the subset of the database is insufficient for controlling said group of one or more building control or access devices; and sending, to the server, a request indicative of the further logic required to control said group.

12. The method of claim 11, further comprising, in response to receiving said request at the server sending, from the server, at least one of:

an update of logic in the local copy of the subset of the database;

an indication for controlling said group of one or more devices in response to said one or more received signals indicative of at least some of said one or more events to at least one of:

a controller; and at least one of said group of one or more building control or access devices.

13. The method of claim 10, further comprising:

displaying, to a user, system settings governing the logic stored in the database on the server for controlling said one or more building control or access devices in response to said one or more events; and presenting an interface to allow the user to alter at least some of the system settings governing the logic for controlling said one or more building control or access devices in response to said one or more events.

14. A non-transitory computer-readable storage medium storing computer-executable instructions for controlling, in response to one or more events, one or more building control or access devices in a system including one or more sensors, the computer-readable instructions comprising instructions that, when executed by a computing system having a processor, cause the computing system to perform operations, the operations comprising: defining a plurality of appliance types such that appliance instances may be created, which correspond to the one or more sensors or the one or more building control or access devices; defining a set of actors which interact with appliances for defining the behavior of each appliance type; wherein the actors include at least one input value type, at least one output value type and at least one counter, timer or clock; and relating actors to individual appliance instances to provide control of said one or more building control or access devices; wherein the controlling, in response to one or more events, the one or more building control or access devices is accomplished by performing the method of claim 10.

15. The computer-readable storage medium of claim 14, wherein the appliance instance for each of the one more building control or access devices may be reallocated to another of said plurality of defined appliance types to alter the behavior of said one more building control or access devices.

16. A building or access management controller for controlling one or more building control or access devices in a system including one or more sensors in response to one or more events, the building or access management controller comprising:

the computer-readable storage medium of claim 14;

a processor operable to execute the instructions; and one or more interfaces operable to communicate with said one or more building control or access devices or sensors.

17. A building or access management method for controlling, in response to one or more events, one or more building control or access devices in a system including one or more sensors, the method comprising:

defining a plurality of appliance types such that appliance instances may be created, which each correspond to one of the one or more sensors or to one of the one or more building control or access devices; and defining a set of actors which interact with appliances for defining the behavior of each appliance type;

relating actors to individual appliance instances;

receiving from a server updates to a local copy of a subset of a database, wherein the database is provided on the server and contains logic for controlling said one or more building control or access devices in response to said one or more events, and wherein the local copy of the subset of the database contains logic relevant to said group of one or more devices;

writing said received updates to a further local copy of the subset of the database;

replacing at least some of the logic stored in said local copy of said subset of the database with at least some updated logic stored in said further local copy of said subset of the database;

receiving one or more signals indicative of said one or more events relevant to said group of one or more building control or access devices; and controlling said group of one or more building control or access devices in response to said one or more signals based on:

read-only access to the local copy of the subset of the database in response to at least some of said one or more events; and the relating of actors to individual appliance instances.

18. The method of claim 17, wherein the one or more building control or access devices are selected from the group comprising: an access control mechanism; an environmental control system; a lighting system; a manufacturing system and a building transport system.

* * * * *